United States Patent

[11] 3,633,414

| [72] | Inventors | Harold S. Field;<br>James C. Harper, both of Tulsa, Okla. |
|---|---|---|
| [21] | Appl. No. | 32,231 |
| [22] | Filed | Apr. 27, 1970 |
| [45] | Patented | Jan. 11, 1972 |
| [73] | Assignee | Geophysical Research Corporation<br>Tulsa, Okla. |

[54] METHOD AND APPARATUS FOR MEASURING RATE OF BOTTOM HOLE PRESSURE CHANGE
6 Claims, 3 Drawing Figs.

[52] U.S. Cl.................................... 73/152, 73/407 R
[51] Int. Cl...................................... E21b 47/06
[50] Field of Search........................... 73/152, 155, 407, 211, 395

[56] References Cited
UNITED STATES PATENTS

| 1,898,951 | 2/1933 | Goodwin | 73/211 |
| 2,449,556 | 9/1948 | Kirkley | 73/211 X |
| 3,318,153 | 5/1967 | Lode | 73/407 X |

*Primary Examiner*—Jerry W. Myracle
*Attorney*—Head & Johnson

ABSTRACT: The rate of change of bottom hole pressure within oil and gas wells is measured by an apparatus and method. The pressure differential across a flow restriction placed between well hole pressure and a pressure gauge is measured to provide a direct indication of rate of change of pressure.

PATENTED JAN 11 1972 3,633,414

INVENTORS,
HAROLD S. FIELD
JAMES C. HARPER
BY Head & Johnson
ATTORNEYS

METHOD AND APPARATUS FOR MEASURING RATE OF BOTTOM HOLE PRESSURE CHANGE

BACKGROUND OF THE INVENTION

It is well known in the art of drilling and producing wells from subterranean formations that information on pressures within such wells under various conditions may be translated into factors which are indicative of the conditions of the formation and reservoir. Such information can provide means for efficiently and economically evaluating and developing wells and reservoirs. The accuracy of such pressure recordings is important since it is solely determinative of many unknown factors relating to reservoir conditions. The testing of a well is time consuming and an expensive operation and the sensitivity of the pressure-recording apparatus is an important factor in determining the length of the test.

Over the years reservoir pressure measurement technology has not changed although many attempts to increase the sensitivity of the instruments have been made. For many years a measurement resolution of one-hundredth of p.s.i. has been considered sufficiently sensitive and accurate. However, in order to shorten testing time without a loss in accuracy, reservoir analysts must have resolution accuracy within the range of about one ten-thousandth of a p.s.i. Present techniques such as increasing the resolution of the pressure-measuring instruments and differential pressure-measuring devices do not satisfactorily accomplish this result.

SUMMARY OF THE INVENTION

This invention, therefore, has for its object the provision of an apparatus and method for measuring a rate of change of pressure over an interval of time within oil and gas-producing wells. The result is a high resolution accuracy within the range desired.

The invention in its broadest concepts introduces a restriction, with a known time constant, within the flow of fluid to an elastic pressure-responsive means (Bourdon tube). Pressure differentials across this restriction are constantly monitored and recorded to provide a direct reading of rate of pressure change.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1A:
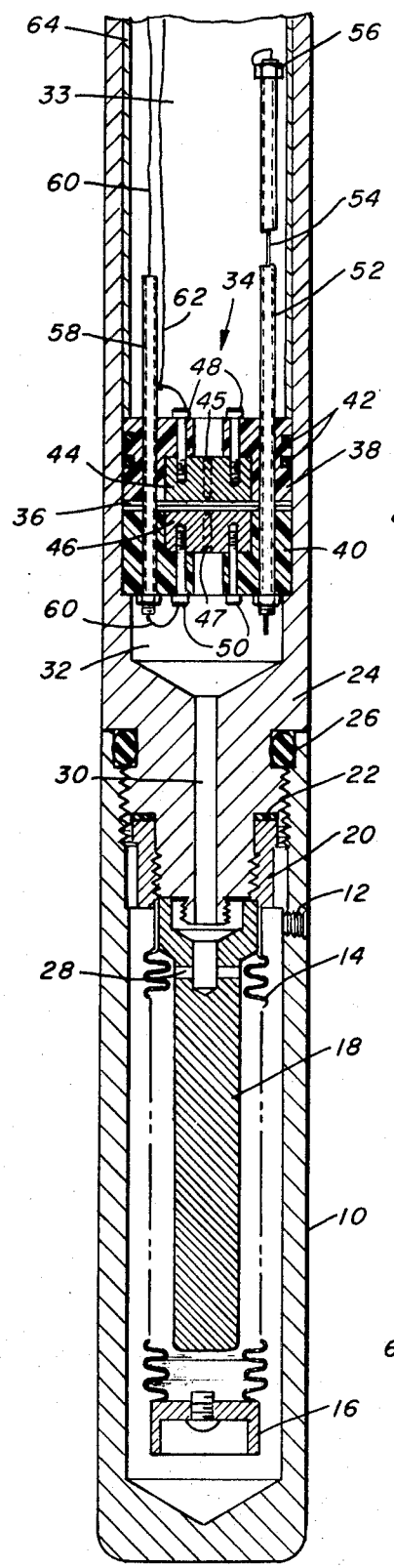
FIGS. 1A, 1B, and 1C are broken sectional views of an apparatus for typical use in this invention from the bottom to the top, respectively.
Figure 1B:
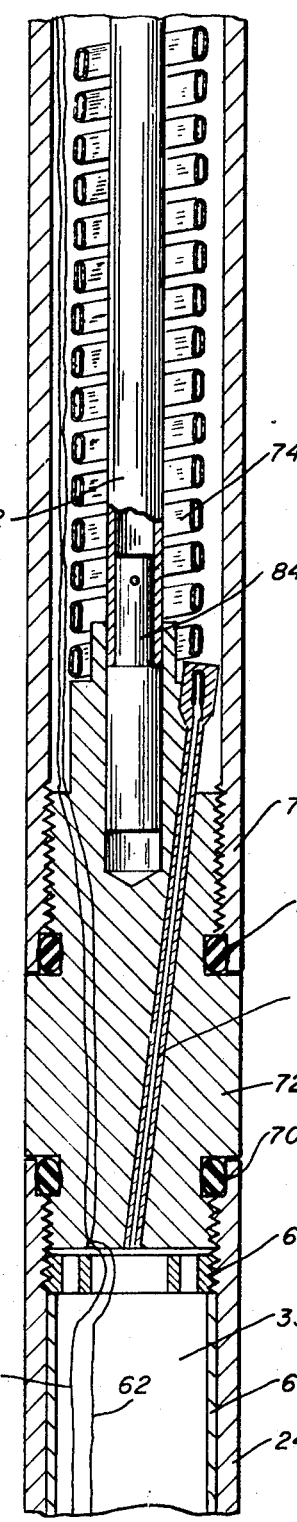
Figure 1C:
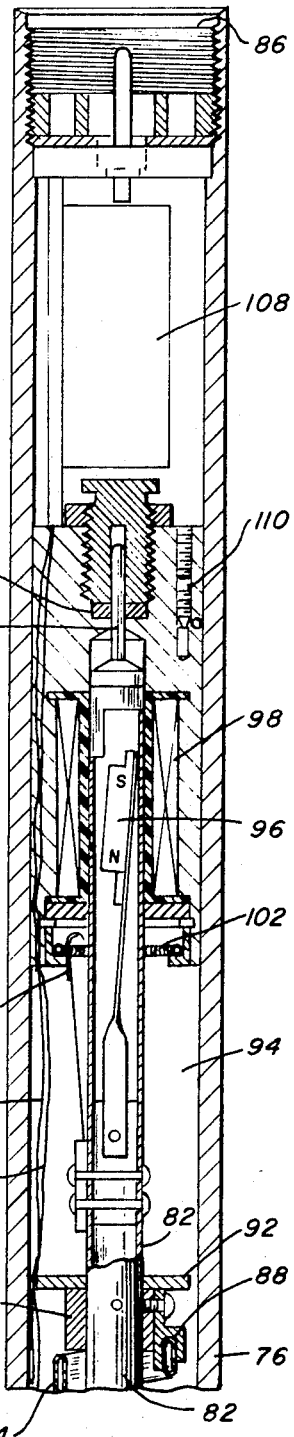

Beginning at FIG. 1A the bottom hole pressure-measuring device includes a reservoir fluid trap 10 having a port 12 therein for communication with an expandable bellows 14 which is closed at the bottom end by a cap 16 with the top end of the bellows being connected to threaded end of damping housing 24 and sealed thereto by gasket 22. Suitable seals such as O-rings 26 may be further utilized in the connection of trap 10 and housing 24. The bellows assembly spacer 18 is provided to reduce the quantity of oil necessary to fill the system, and includes conduits 28 which are in fluid communication with the conduit 30 of the housing 24 entering a lower chamber 32 which is created by a pressure measuring cell generally designated by the numeral 34. The particular cell described is a capacitance type and includes a metallic flexible diaphragm 36 which is clamped between upper and lower insulator sleeves 38 and 40, respectively. The upper sleeve includes O-ring seals 42. Upper and lower capacitor plates 44 and 46 are retained to the respective sleeves by bolts 48 and 50. Respective openings 45 and 47 provide communication of the fluid (usually a high dielectric such as transformer oil) with each side of diaphragm 36. Attached to and extending through the cell 34 is damping tube 52 which provides a time constant in the fluid flow from the lower chamber 32 to the upper chamber 33. The tube in one example is 12 to 16 inches long and of 0.035 inch bore. Within the tube is suspended axially, or substantially so, a wire 54 which, in this example, is 0.034 inch in diameter, the wire being held in a suitable manner as by anchor nut 56. Tube 58, which is sealed to any flow communication, provides a conduit for wire 60, which provides connection to plate 46 through bolt 50, while the outside of the tube permits electrical contact with the diaphragm 36. Electrical contact with the upper capacitor plate 44 is by means of bolt 48 and wire 62. An interior retainer sleeve 64 abuts against the upper housing 38 to retain the pressure measuring cell in position, being locked by threaded sleeve 68 shown in FIG. 1B. The upper end of housing 24 is threaded and sealed by the O-ring 70 to connector 72 which also forms the base for the elastic Bourdon-type pressure tube or coil 74 which is interior of tube housing 76 also sealed to the connector 72 by O-ring 78. The interior of the coil is in communication with the chamber 33 through conduit 80. A torque tube 82 extends coaxially interiorly of the pressure coil 74 being attached to and rotatable with lower bearing guide 84. Wire leads 60 and 62 are sealably connected across the connector 72 upwardly to the electrical assembly housing 108 or to suitable recording instruments. As best shown in FIG. 1C and to a greater extent described in U.S. Pat. application Ser. No. 447,223, filed Apr. 12, 1965, and now U.S. Pat. No. 3,275,296, the pressure coil housing 76 continues upward to a connector 86 which is adapted to receive a suitable plug, not shown, for making electrical connection with the various components of this invention and for transmitting the information thereof to recording devices, usually at the surface of the well. The pressure coil 74 terminates and is closed at its upper end by connection with member 88 which in turn is attached to torque tube 82 via collar 90. Hence, as is well known in the art, the application of the pressure to the coil 74 interior tends to expand same radially, which movement is transmitted into linear and rotary movement of the torque tube 82. The torque tube includes a centralizer 92 and extends into an upward measuring chamber 94 wherein the rotary movement of the torque tube 82 is further translated into recordable information by the movement of wiper contact 100 relative to electrical resistance element 102. As more aptly described in said U.S. Pat. application, the permanent magnet 96 and surrounding coil 98 is utilized to withdraw and protect wiper contact 100 from contact with element 102 when the gauge is not in use. The upper end of the torque tube 82 terminates with pin 104 riding within a jeweled bearing 106. Suitable connection, electrically, is made with the electrical assembly housing designated by the numeral 108, which is adapted to make interconnection through the plug and connector 86 to suitable recording apparatus, typically at the surface of the well.

Two measurements are made by the instrument of this invention, one being the reading obtained from the pressure-measuring cell 34 and the other being the ordinary bottom hole pressure measurement received through resistor element 102 by the relative position of wiper 100 as the result of the rotational movement of torque tube 82. One or both or alternatively one then the other of these measurements may be sent to the surface recording apparatus by an electrical pulse technique. That is, a pulse of desired significance is transmitted to the electrical assembly 108 which is adapted to pick up and transmit information concerning either the pressure across the measuring cell 34 and/or the normal pressure indicating signal from resistance wire 102.

OPERATION

The operation and usage of the apparatus above-described is particularly applicable to what is known as "pulse-testing" techniques for determining underground reservoir properties between wells. However, it is to be understood that the device is also applicable to other bottom hole pressure-measuring techniques such as pressure buildup testing and "draw-down" techniques used in pumping wells. As such, the instrument provides means for recording the rate of change of pressure by recording the differential pressure across the flow restrictor tube 52. As such, recorded measurements, wherein full scale may be equal to 1 p.s.i., will permit a resolution equal to 0.0001 p.s.i. This reading is accomplished by reading across the pressure-measuring cell 34 which in this example is of a capacitance type. The flow restrictor tube or dampening wire and tube assembly 52 and 54 effectively becomes a time constant between the subterranean reservoir and the elastic chamber of the Bourdon tube 82. This pressure drop is continuously monitored and measured from the pressure cell 34, the measurement being adequately received and recorded as heretofore described. By relating the pressure drop and the actual time constant, the readout of the pressure-measuring cell gives a direct indication of the rate of change of pressure and hence high resolution accuracies desired for reservoir analysis.

What is claimed is:

1. Apparatus to measure the rate of change of bottom hole well fluid reservoir pressure comprising:
    an elastic fluid-pressure-responsive means;
    first means in communication with and responsive to changes of said reservoir well fluid pressure to create a fluid flow to said elastic pressure-responsive means;
    a pressure-measuring cell positioned across said fluid flow path and between said first means and said elastic fluid-pressure-responsive means, said cell including,
    a flow restrictor of known time constant positioned within said fluid flow path to create a changing pressure differential as a function of said reservoir well fluid pressure changes across said cell, and
    means to monitor and measure said pressure differential at any desired time.

2. Apparatus of claim 1 including means to measure the movement of said elastic pressure means as an indicator of said reservoir well fluid pressure.

3. Apparatus of claim 1 wherein said means to measure said pressure differential is a capacitance type.

4. Apparatus of claim 3 wherein said means to measure comprises:
    an electrically conductive diaphragm, one side exposed to said separate fluid pressure on one side of said cell, the other side exposed to said separate fluid pressure on the other side;
    a capacitance plate secured on each side of said diaphragm; and
    means to supply voltage to each plate and said diaphragm.

5. Apparatus of claim 1 wherein said time constant control comprises:
    an elongated conduit; and
    a wire of slightly less diameter than said conduit substantially axially positioned the length of said conduit.

6. A method of measuring a rate of change of bottom hole reservoir pressure in wells using a fluid elastic chamber-measuring means comprising:
    positioning a flow restrictor tube of known time constant between said reservoir and said chamber;
    measuring the pressure drop across said flow restrictor tube; and thereby
    determining the rate of change of pressure.

* * * * *